(12) United States Patent
Thornton et al.

(10) Patent No.: US 7,457,964 B2
(45) Date of Patent: Nov. 25, 2008

(54) TRUSTED PATH FOR TRANSMITTING CONTENT THEREON

(75) Inventors: Andrew John Thornton, Seattle, WA (US); John E. Paff, Redmond, WA (US); Marcus Peinado, Bellevue, WA (US); Thekkthalackal Varugis Kurien, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 858 days.

(21) Appl. No.: 10/771,888

(22) Filed: Feb. 4, 2004

(65) Prior Publication Data

US 2005/0172134 A1 Aug. 4, 2005

(51) Int. Cl.
*H04K 1/00* (2006.01)
*H04L 9/00* (2006.01)

(52) U.S. Cl. ............... 713/182; 713/155; 726/26
(58) Field of Classification Search ......... 370/410, 370/426, 373, 377, 384, 385; 713/193, 200; 380/277, 201, 202, 282
See application file for complete search history.

(56) References Cited

U.S. PATENT DOCUMENTS

| | | | | |
|---|---|---|---|---|
| 5,715,403 A | 2/1998 | Stefik | | 395/244 |
| 6,901,510 B1* | 5/2005 | Srivastava | | 713/163 |
| 7,103,574 B1* | 9/2006 | Peinado et al. | | 705/51 |
| 7,383,436 B2* | 6/2008 | Srivastava et al. | | 713/163 |
| 2005/0114689 A1* | 5/2005 | Strom et al. | | 713/193 |
| 2006/0212363 A1* | 9/2006 | Peinado et al. | | 705/26 |
| 2006/0259770 A1* | 11/2006 | Peinado | | 713/171 |
| 2006/0280309 A1* | 12/2006 | Krishnaswamy et al. | | 380/285 |
| 2007/0038859 A1* | 2/2007 | Tadayon et al. | | 713/168 |
| 2007/0067645 A1* | 3/2007 | Dublish et al. | | 713/189 |
| 2007/0124809 A1* | 5/2007 | Narin et al. | | 726/6 |
| 2008/0056499 A1* | 3/2008 | Vanstone | | 380/278 |
| 2008/0072040 A1* | 3/2008 | Asano et al. | | 713/158 |
| 2008/0104400 A1* | 5/2008 | Kocher et al. | | 713/172 |

FOREIGN PATENT DOCUMENTS

| | | |
|---|---|---|
| WO | WO 00/58811 | 10/2000 |
| WO | WO 00/59150 | 10/2000 |
| WO | WO 01/52021 A1 | 7/2001 |

OTHER PUBLICATIONS

Hong, S. et al., "On the construction of a powerful distributed authentication server without additional key management", *Computer Communications*. 2000, 23, 1638-1644.

Managing Digital Rights in Online Publishing, "How two publishing houses maintin control of copyright" *Information Management & Technology*, 2001,34(4), 168-169.

Jakobsson, M. et al., "Proprietary Certificates", *Topics in Cryptology*, 2002, 164-181.

(Continued)

*Primary Examiner*—Ajit G Patel
(74) *Attorney, Agent, or Firm*—Woodcock Washburn LLP (57) ABSTRACT

A method is provided for a processor of a computing device to obtain a trusted identification of a hardware peripheral of the computing device, for the computing device and the peripheral to derive a set of shared keys, and for the processor to send trusted data to the peripheral.

14 Claims, 5 Drawing Sheets

OTHER PUBLICATIONS

Kumik, P. "Digital Rights Management", *Computers and Law*, 2000, 11(4), 14-15.

Torrubia, A. et al., "Cryptography regulations for E-commerce and digital rights management", *Computers & Security*, 2001, 20(8), 724-738.

Zwollo, K. "Digital document delivery and digital rights management", *Information Services & Use*, 2001, 9-11.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11), 27.

Gunter, C.A., et al. "Models and Languages for Digital Rights", *Proceedings of the 34th Annual Hawaii International Conference on System Sciences*, 2001, 1-5.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4th International Workshop on Networked Appliances*, 2002, 49-56.

Hwang, C. et al., "Protection of Digital Contents on Distributed Multimedia Environment", *Proceedings of the IASTED International Conference, Internet and Multimedia Systems and Applications*, Nov. 19-23, 2000, Las Vegas, Nevada, USA, pp. 127-132.

\* cited by examiner

TRUSTED PATH FOR TRANSMITTING CONTENT THEREON

TECHNICAL FIELD

The present invention relates to an architecture and method for establishing a trusted path such as a bus or the like by which protected content can be transmitted from a processor or the like to a peripheral or the like in a computer or the like. More particularly, the present invention relates to such an architecture and method whereby the content is transmitted from the processor to the peripheral on the path only after the peripheral is established as being trusted to handle the content only in accordance with policy corresponding to the content.

BACKGROUND OF THE INVENTION

Figure 1:
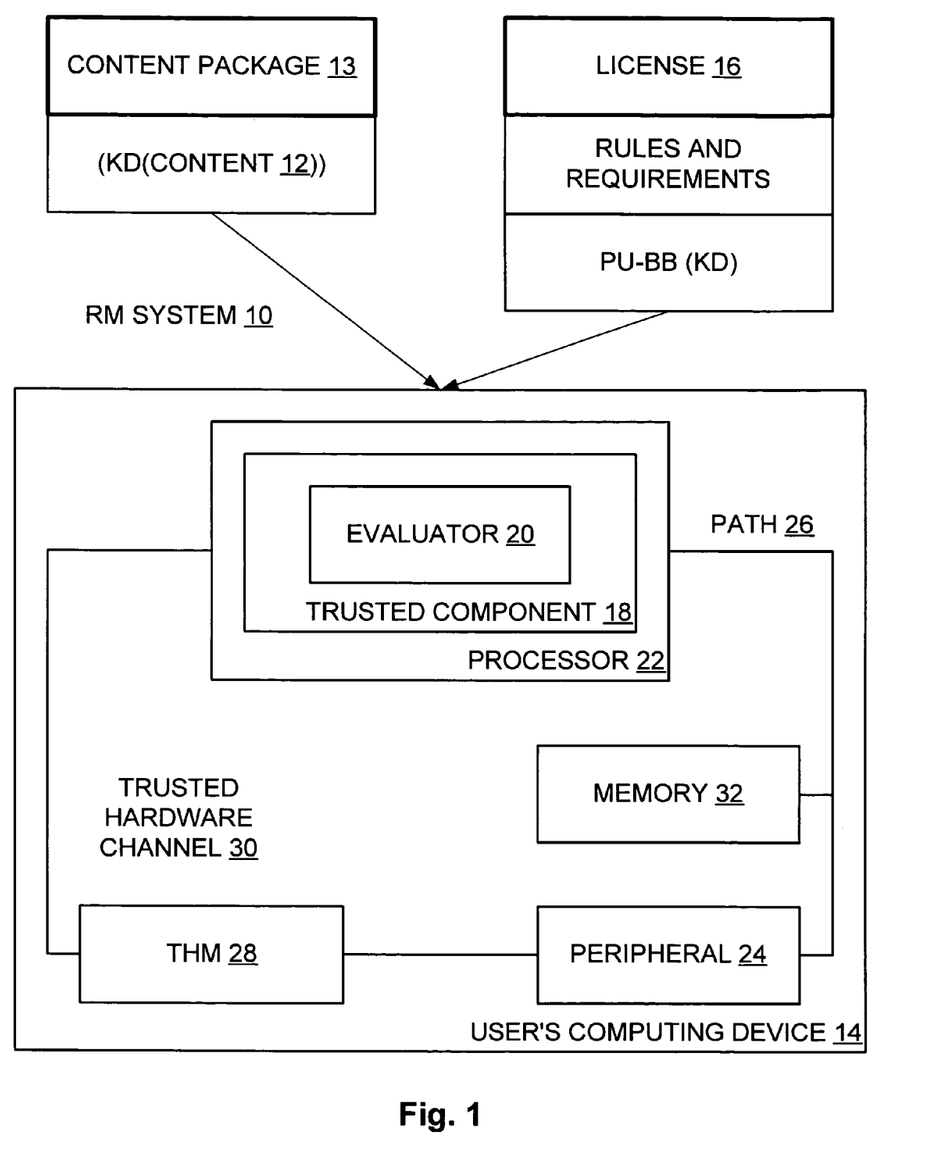
FIG. 1 is a block diagram showing an enforcement architecture of an example of a trust-based system, including a processor, a peripheral, and a path therebetween.

As is known, and referring now to FIG. 1, a rights management (RM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14, a portable playback device or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. An RM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based RM system 10 allows an owner of digital content 12 to specify rules that must be satisfied before such digital content 12 is allowed to be rendered. Such rules can include the aforementioned requirements and/or others, and may be embodied within a digital license 16 that the user/user's computing device 14 (hereinafter, such terms are interchangeable unless circumstances require otherwise) must obtain from the content owner or an agent thereof, or such rules may already be attached to the content 12. Such license 16 may for example include the decryption key (KD) for decrypting the digital content 12, perhaps encrypted according to another key decryptable by the user's computing device or other playback device.

The content owner for a piece of digital content 12 would prefer not to distribute the content 12 to the user unless such owner can trust that the user will abide by the rules specified by such content owner in the license 16 or elsewhere. Preferably, then, the user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the DRM system 10 to carry out the wishes of the owner of the digital content 12 according to the rules, and the user should not be able to easily alter such trusted component 18 and/or the evaluator 20 for any purpose, nefarious or otherwise.

As should be understood, the rules for rendering the content 12 can specify whether the user has rights to so render based on any of several factors, including who the user is, where the user is located, what type of computing device 14 or other playback device the user is using, what rendering application is calling the RM system 10, the date, the time, etc. In addition, the rules may limit rendering to a pre-determined number of plays, or pre-determined play time, for example.

The rules may be specified according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the evaluator 20 determining that the user satisfies the rules, the digital content 12 can then be rendered. In particular, to render the content 12, the decryption key (KD) is obtained from a pre-defined source and is applied to (KD (CONTENT)) from the content package 13 to result in the actual content 12, and the actual content 12 is then in fact rendered.

In an RM system 10, content 12 is packaged for use by a user by encrypting such content 12 and associating a set of rules with the content 12, whereby the encrypted content 12 can be decrypted and rendered only in accordance with the rules. Because the encrypted content 12 can only be decrypted and rendered in accordance with the rules, then, the content 12 may be freely distributed.

As may be appreciated, rendering of the content 12 may be performed in multiple parts of the computing device 14. In particular, it is typical that preliminary rendering of the content 12 occurs in a processor 22 of the computing device 14 upon which the trusted component 18 is instantiated, and that final rendering of the content 12 occurs in a peripheral 24 of the computing device 14. For example, such preliminary rendering in the processor 22 may include the aforementioned decrypting, an evaluation of the processing necessary to render the content 12, a division of the content 12 into components thereof, and forwarding of each component of the content 12 to an appropriate location such as the aforementioned peripheral 24 for further processing and the aforementioned final rendering. As should be evident, such peripheral 24 and corresponding final rendering may be any appropriate peripheral 24 and final rendering. For example, for a video component of content 12, the peripheral 24 may be a video processor or graphics processing unit where the video component is employed to render screen pixels, and for an audio component of content 12, the peripheral 24 may be a sound processor or audio processing unit where the audio component is employed to generate speaker input. Note too that the content 12 may be protected going to a peripheral 24 such as a storage device or a network card, or may be incoming data from an external source such as a microphone, a camera, a remote location, etc. Typically, each peripheral 24 is coupled to the processor 22 by way of a path 26 such as a common bus. For example, the bus may be a PCI (Peripheral Component Interconnect) bus or another bus.

Preferably, each component of the content 12 is transmitted over the path 26 in an encrypted form from the source processor 22 to the destination peripheral 24. Thus, the component cannot be copied in an unencrypted digital form from the path 26. Such encrypted form may be the original encryption of the content 12, or more typically is an encryption of the component after the content 12 has been decrypted and preliminarily rendered by the processor 22.

As was stated above, the trusted component 18 on the processor 22 exists to ensure that the content 12 is rendered only in accordance with the rules specified by the content owner in the corresponding license 16 or elsewhere. However, the ability of the trusted component 18 to perform such function decreases as the content 12 moves from the processor 22 to a peripheral 24, especially when the peripheral has processing abilities of its own. That is, while the trusted component 18 as instantiated on the processor 22 can more tightly control how and whether such processor 22 handles the protected content 12, such trusted component 18 cannot as tightly control how and whether the peripheral 24 likewise handles the protected content 12, especially when the peripheral 24 has its own processor or the like and such processor is not under the control of the processor 22. Accordingly, the trusted component 18 should not allow the processor 22 to transmit content 12 to such a peripheral 24 over the path 26 therebetween unless the peripheral 24 can be established as trustworthy in that the peripheral can be trusted to handle content 12 received thereby only in accordance with the aforementioned rules.

Accordingly, a need exists for an architecture and method that define a trusted path 26 by which content 12 can be transmitted from a processor 22 to a peripheral 24 in a computing device 14. In particular, a need exists for a method and architecture that defines how to establish that a peripheral 24 in a computing device 14 is trustworthy.

SUMMARY OF THE INVENTION

The aforementioned needs are satisfied at least in part by the present invention in which a method is provided for a processor of a computing device to obtain a trusted identification of a hardware peripheral of the computing device, where the processor and the peripheral are coupled by a path through which data is to be exchanged therebetween. In the method, the processor requests by way of a trusted hardware channel that the peripheral provide the identification to such processor by way of such trusted channel. The trusted channel being independent of and exterior to the path. The processor receives by way of the trusted hardware channel the identification from the peripheral, and the processor, having prior knowledge of the peripheral and the identification thereof, concludes based on the received identification by way of the trusted channel that the peripheral is indeed the peripheral, and imparts trust to the peripheral based on such conclusion. Thereafter, the processor and the peripheral exchange data over the path based on the identification.

The computing device and the peripheral derive a set of shared keys by each generating a random value, performing a first operation based on the random value thereof to produce an intermediary value, and sending the produced intermediary value to the other by way of the path. The peripheral in particular also generates a signed representation of the intermediary value and sends the signed representation to the processor by way of the path, where the signed representation is verifiable by the processor. The processor and the peripheral each then perform a second operation based on the intermediary value from the other and also based on the random value thereof to produce a final value, where the final value as produced by the processor is equal to the final value as produced by the peripheral and thus constitutes a shared secret known only to the processor and the peripheral. Thereafter, the processor and the peripheral each employ the shared secret to generate the set of shared keys.

The set of shared keys includes a shared symmetric content key KC to encrypt and decrypt data and a shared symmetric MAC key KM employed as part of a MAC algorithm to sign the data and verify same, and the processor sends trusted data to the peripheral by the processor retrieving the data from a trusted section of a memory of the computing device, encrypting such data according to the content key KC, performing the MAC algorithm over the encrypted trusted data according to the MAC key KM to produce MAC data, storing the encrypted trusted data in a non-trusted section of the memory, and storing the MAC data in such non-trusted section of the memory. In addition, the processor stores information regarding how to access such stored encrypted trusted data and MAC data in the memory as a transfer descriptor in the non-trusted section of the memory, and then provides the peripheral by way of the path with a physical address of such transfer descriptor in such memory.

The peripheral accesses the transfer descriptor in the memory at the physical address thereof by way of the path, reviews the information in the transfer descriptor, and retrieves the stored encrypted trusted data and MAC data in the memory based on the information and by way of the path. Then, the peripheral verifies the retrieved encrypted trusted data based on the retrieved corresponding MAC data and according to the MAC key KM, and presuming such verification succeeds, the peripheral decrypts the retrieved encrypted trusted data based on the content key KC and renders the decrypted trusted data.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 2:
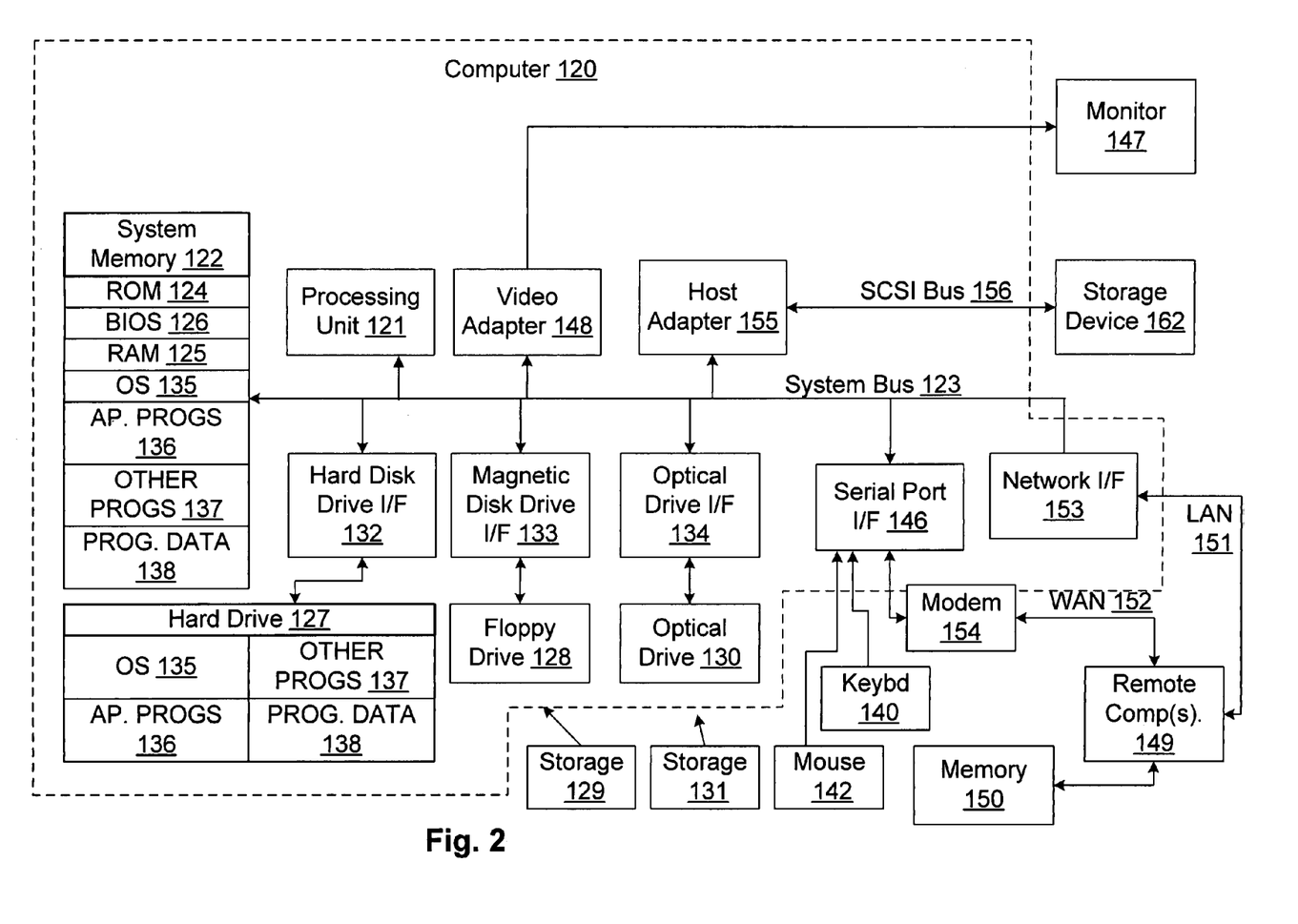
FIG. 2 is a block diagram representing a general purpose computer system in which aspects of the present invention and/or portions thereof may be incorporated.

FIG. 2 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Trusted Path 26/Peripheral 24

Content protection denotes a spectrum of methods and technologies for protecting digital content 12 such that such content 12 cannot be used in a manner inconsistent with the wishes of the content owner and/or provider. Methods include copy protection (CP), link protection (LP), conditional access (CA), rights management (RM), and digital rights management (DRM), among other. The Base of any content protection system is that only a trusted application that ensures proper adherence to the implicit and/or explicit rules for use of protected content 12 can access same in an unprotected form. Typically, content 12 is protected by being encrypted in some way, where only trusted parties are able to decrypt same.

Copy protection, in the strictest sense, specifically applies to content 12 residing in a storage device, whereas link protection applies to content 12 flowing between applications/devices over a transmission medium. Conditional access can be thought of as a more sophisticated form of link protection, where premium programs, channels and/or movies are encrypted in transit. Only subscribers who have paid for access to such content 12 are provided with the keys necessary to decrypt same.

Digital Rights Management is an extensible architecture where the rules regarding sanctioned use of a particular piece of content 12 are explicit and bound to or associated with the content 12 itself. DRM mechanisms can support richer and more expressive rules than other methods while providing greater control and flexibility at the level of individual pieces of content or even sub-components of that content. An example of a Digital Rights Management system is set forth in U.S. patent application Ser. No. 09/290,363, filed Apr. 12, 1999 and U.S. Provisional Application No. 60/126,614, filed Mar. 27, 1999 each of which is hereby incorporated by reference in its entirety.

Rights Management is a form of DRM that is organizationally based in that content 12 can be protected to be accessible only within an organization or a subset thereof. An example of a Rights Management system is set forth in U.S. patent applications Ser. Nos. 10/185,527, 10/185,278, and 10/185,511, each filed on Jun. 28, 2002 and hereby incorporated by reference in its entirety.

In the present invention, protected content 12 is transmitted from a processor 22 or the like to a peripheral 24 or the like by way of a path 26 or the like in a trusted manner. Thus, the content 12 is protected from being intercepted en route in a manner that the content 12 can be obtained in a non-encrypted form and is protected from being modified en route. As may be appreciated, then, the protected content 12 as transmitted is encrypted to hide same, and is accompanied by a verifying mechanism. Such encryption may be performed in any appropriate manner without departing from the spirit and scope of the present invention, although it is typical that the encryption is by way of a symmetric key and symmetric key algorithm. Likewise, the verifying mechanism may be any appropriate verifying mechanism without departing from the spirit and scope of the present invention, although it is typical at least in a stream of content 12 that the verifying mechanism be a running H-MAC-type signature.

Note, though, that even when the content 12 is protected by way of encryption and a verifying mechanism, the path 26 between the processor 22 and the peripheral 24 is not trustworthy. In particular, the processor 22 in transmitting the content 12 through the path 26 cannot be sure that the recipient of such content 12 is in fact the peripheral 24 to which the content 12 was directed, unless steps are taken to positively identify such peripheral 24 and to ensure that only such peripheral can decrypt the encrypted content 12. That is, it can be the case that a nefarious entity wishing to steal the content 12 may pose as a particular peripheral 24 or may interpose itself between the processor 22 and the peripheral 24, and the processor 22 would not be aware of such a deception unless the processor 22 in identifying the 'peripheral' discovered same. However, in the course of the processor 22 attempting to identify the peripheral 24, it is comparatively simple for a posing nefarious entity to respond to an identifying request from the processor 22 in a manner acceptable thereto, or for an interposing nefarious entity to intercept an identifying request from such processor 22 and likewise respond in a manner acceptable thereto, especially in the case where the processor 22 has taken no special actions to verify the modules that combine to constitute the path 26.

Accordingly, and in one embodiment of the present invention, and as seen in FIG. 1, the computing device 14 is coupled to the peripheral 24 by a trusted hardware channel 30 that is independent of and exterior to the path 26. Thus, such trusted channel 30 is a trusted sideband to the path 26. Such trusted channel may be a direct link between the processor 22 and the peripheral 24, or may be implemented by way of an intermediary. In one embodiment of the present invention, and as also seen in FIG. 1, the computing device 14 includes a trusted hardware module (THM) 28 as the intermediary, where such THM is physically interposed between the processor 22 and the peripheral 24 to form the trusted hardware channel 30 therebetween. Such THM 28 is trusted to communicate with both the processor 22 and the peripheral 24 in a trusted manner over the trusted channel 30, and is identifiable to the processor 22 over the trusted channel 30 in a manner such that a nefarious entity in attempting to steal content cannot pose as the THM 28 either as hardware or as software pretending to be hardware.

Such a THM 28 is known or should be apparent to the relevant public and therefore need not be set forth herein in any detail. Accordingly, any appropriate THM 30 may be employed without departing from the spirit and scope of the present invention. For example, the THM 28 may be a Trusted Platform Module (TPM) that establishes the trusted channel 30 by way of a pair of lines—one to the processor 22 and the other to the peripheral 24—that are associated with the PCI bus that typically forms the aforementioned path 26, but that are not employed by the PCI bus in connection with the functionality thereof according to the standard by which the PCI bus operates. Thus, such lines though literally part of the PCI bus do not in fact perform any function with the PCI bus and thus satisfy the requirement of forming a trusted channel 30 that is independent of and exterior to the path 26 by which the processor 22 and the peripheral 24 communicate.

Figure 3:
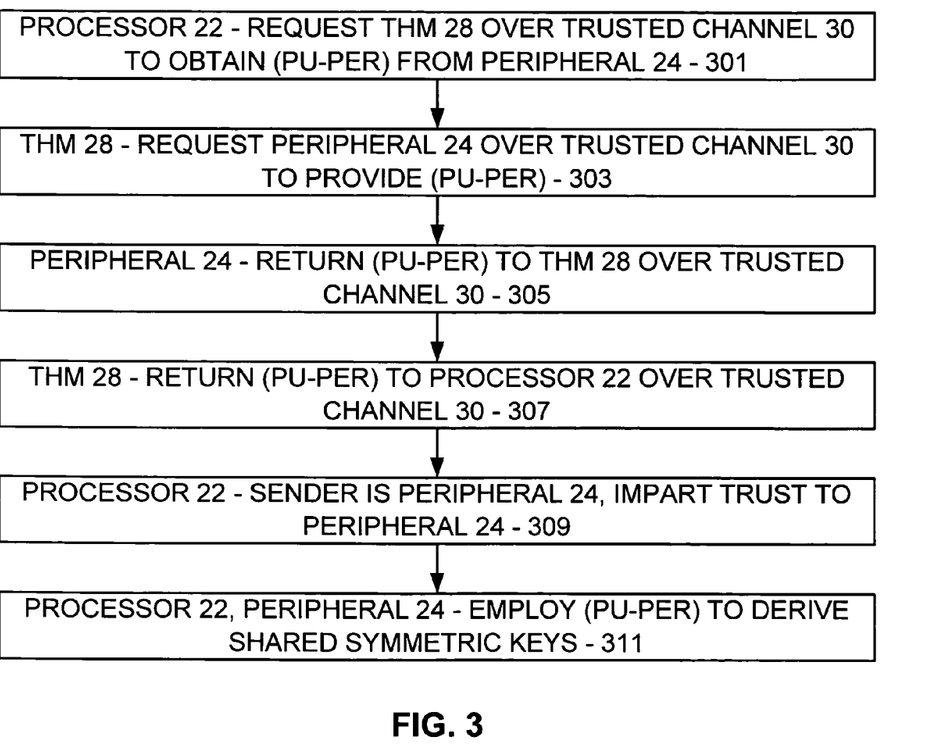
FIG. 3 is a flow diagram showing key steps performed by the elements of FIG. 1 in establishing the identity of the peripheral to the processor in a trusted manner.

With such THM 30, and referring now to FIG. 3, the processor 22 obtains a trusted identification of the peripheral 24 in the following manner. Preliminarily, it is presumed that the peripheral 24 includes therewith a public-private security key pair (PU-PER, PR-PER), where such key pair is not only available to the peripheral 24 for cryptographic functions that may be performed thereon, but is also unique to the peripheral 24 and thus can be employed to uniquely identify the peripheral 24. Typically, such key pair is physically bound to the peripheral 24, for example by being 'baked' into the peripheral 24 during manufacture thereof, and the peripheral 24 cannot substitute other keys therefor, for example at the behest of the aforementioned nefarious entity.

Also typically, the public key (PU-PER) of the peripheral 24 is available to be distributed publicly, but the private key (PR-PER) of the peripheral 24 is closely guarded by the peripheral 24 and is not made publicly available. However, and appreciating that (PU-PER) uniquely identifies the peripheral 24 to the world, such (PU-PER) should not be openly transmitted to the world out of concern that such a public disclosure may constitute a privacy violation in at least some circumstances and/or in at least some political entities. Thus, for the processor 22 to identify the peripheral 24 in a trusted manner, and in connection with the architecture thus far set forth above, the processor 22 requests the THM 28 over the trusted channel 30 formed thereby to obtain (PU-PER) from the peripheral 24 (step 301), and the THM 28 in turn requests the peripheral 24 over the trusted channel 30 formed thereby to provide such (PU-PER) (step 303). Significantly, because each request is over the trusted channel 30, the processor 22 can be assured that the request of step 301 is in fact directed to the THM 28, and the THM 28 can be assured that the request of step 303 is in fact directed to the peripheral 24.

In response, the peripheral 24 returns (PU-PER) to the THM 28 over the trusted channel 30 formed thereby (step 305), and the THM 28 in turn returns (PU-PER) to the processor 22 over the trusted channel 30 formed thereby (step 307). As before, because each returned response is over the trusted channel 30, the processor 22 can be assured that the response of step 307 is in fact from the THM 28, and the THM 28 can be assured that the response of step 305 is in fact from the peripheral 24. As should now be appreciated, after step 307, the processor 22 has (PU-PER) from the peripheral 24 and can be assured that such (PU-PER) in fact is from and uniquely identifies the peripheral 24 because such (PU-PER) was obtained over the trusted channel 30. Note, too, that because (PU-PER) was obtained by the processor 22 over the trusted channel 30, and because the trusted channel 30 is not accessible except by the processor 22, the peripheral 24, and the THM 28, the privacy of (PU-PER) has been maintained to an acceptable degree.

Presumably, the processor 22 has prior knowledge of the peripheral 24 and (PU-PER) thereof and can based on having received (PU-PER) as at step 307 by way of the trusted channel 30 conclude that the sender is indeed the peripheral 24 and not some nefarious entity posing as the peripheral 24 or interposed between the processor 22 and the peripheral 24. Thus, the processor 22 can impart trust to the peripheral 24 based on such conclusion (step 309), and can exchange data with the peripheral 24 based on (PU-PER). While such data exchange can be based on the processor 22 encrypting and decrypting such data as the case may be based on (PU-PER) and the peripheral 24 likewise decrypting and encrypting such data as the case may be based on (PR-PER), it is to be appreciated that asymmetric cryptography is much more computationally expensive than symmetric cryptography. Accordingly, in one embodiment of the present invention, the processor 22 and the peripheral 24 employ (PU-PER) to derive a set of mutually agreed-upon shared symmetric keys that will be employed to exchange data therebetween (step 311).

Deriving such a set of mutually agreed-upon shared symmetric keys may be performed by the processor 22 and the peripheral 24 in any particular manner without departing from the spirit and scope of the present invention, as long as the process of so deriving is trusted so that a nefarious entity observing the process cannot itself derive such keys. Such trusted derivation is known or should be apparent to the relevant public and therefore need not be set forth herein in any detail. For example, such trusted derivation may be accomplished by way of a Diffie-Hellman key exchange such as is disclosed in Applied Cryptography—Protocols, Algorithms and Source Code in C, Second Edition, by Bruce Schneier, ISBN 0471-11709-9, hereby incorporated by reference in its entirety.

Figure 4:
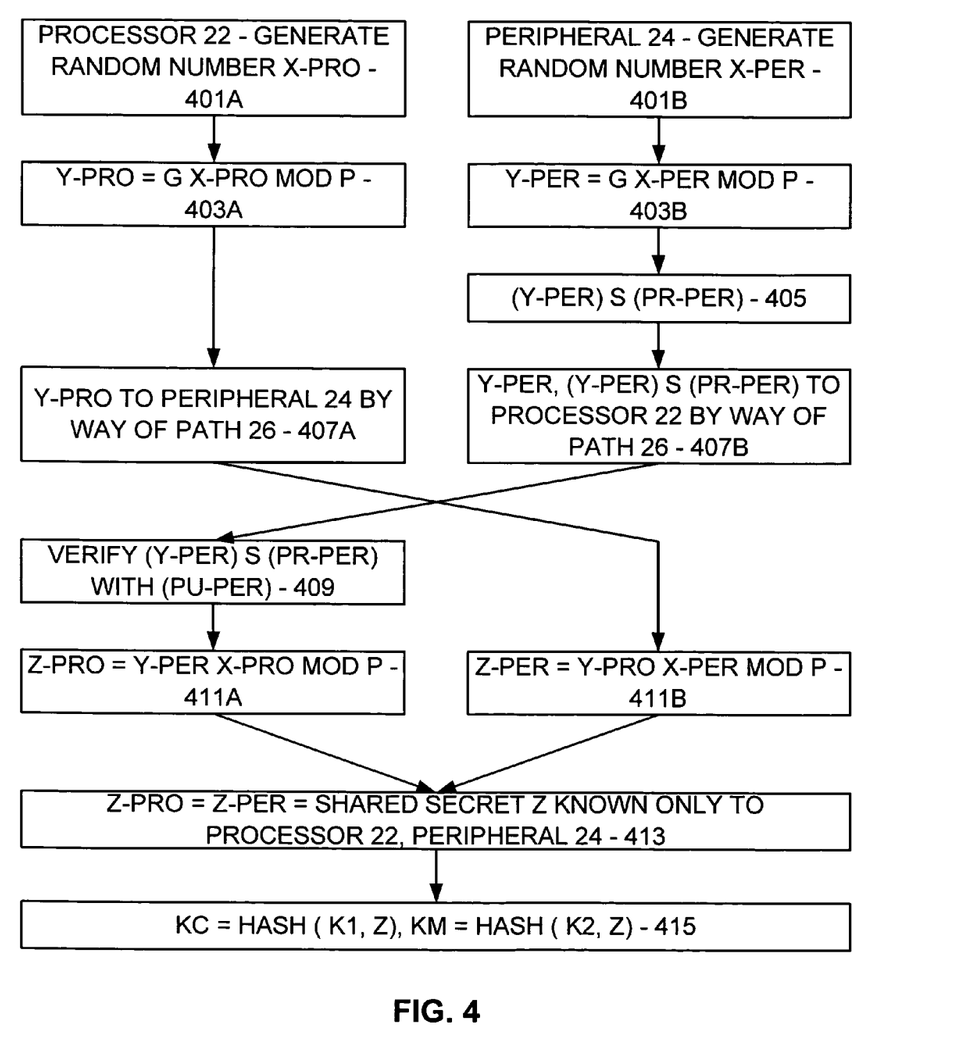
FIG. 4 is a flow diagram showing key steps performed by the elements of FIG. 1 in establishing keys in a trusted manner so that the processor and peripheral can exchange data.

To use such Diffie-Hellman key exchange, it is presumed that both the processor 22 and the peripheral 24 have the capability to generate a random number RND, and that both have access to a commonly known 'base' g and prime number p. Using the Diffie-Hellman key exchange, then, and turning now to FIG. 4, it is seen that each of the processor 22 and the peripheral 24 generates a respective random number x-pro, x-per (steps 401a, 401b) and then calculates an exchange value y-pro, y-per:

$$y\text{-pro}=g^{x\text{-}pro} \bmod p;$$

$$y\text{-per}=g^{x\text{-}per} \bmod p,$$

where mod is a modulus function (steps 403a, 403b). Thereafter, the peripheral 24 signs y-per based on (PR-PER) to produce (y-per) S (PR-PER) (step 405), and sends y-per and (y-per) S (PR-PER) to the processor 22 by way of the path 26 (step 407b). Likewise, the processor 22 sends y-pro to the peripheral 24 by way of the path 26 (step 407a). Note here that the path 26 is not as yet trusted, but since the processor 22 knows and trusts the peripheral 24 and (PU-PER) thereof by way of steps 301-309 of FIG. 3, such processor 22 can apply (PU-PER) to (y-per) S (PR-PER) to verify that y-per was indeed sent by the peripheral 24 (step 409). Note too that although the processor 22 could also sign y-pro based on a private key thereof in a manner akin to that of step 405 and send same to the peripheral 24, such a step is not considered necessary where the peripheral 24 is not required to trust the processor 22.

With the processor 22 having y-per from the peripheral 24 and the peripheral 24 having y-pro from the processor 22, each then applies same to calculate a shared value z-pro, z-per=

$$z\text{-pro}=y\text{-per}^{x\text{-}pro} \bmod p;$$

$$z\text{-per}=y\text{-pro}^{x\text{-}per} \bmod p,$$

(steps 411a, 411b). Crucially, it is to be appreciated that z-pro is equal to the z-per for mathematical reasons that are known to the relevant public and therefore need not be set forth herein in any detail, and thus z-pro=z-per=z is a shared secret that is known only to the processor 22 and the peripheral 24 (step 413). To summarize, even though the processor 22 has no idea of the random number x-per that is known only to the peripheral 24, and even though the peripheral 24 has no idea of the random number x-pro that is known only to the processor 22, both the processor 22 and the peripheral 24 have used x-pro and x-per, respectively, to generate a secret value z that is shared therebetween.

While z may in fact be the set of mutually agreed-upon shared symmetric keys as was set forth above, it is more likely the case that z is not in a form amenable to being a symmetric key for the processor 22 and the peripheral 24, and/or that multiple symmetric keys are required. In fact, in one embodiment of the present invention, z is not a symmetric key but instead is employed by both the processor 22 and the peripheral 24 to generate a shared symmetric content key KC and a shared symmetric MAC key KM.

As may be appreciated, the shared symmetric content key KC is employed both to encrypt and decrypt data sent between the processor 22 and the peripheral 24, and the shared symmetric MAC key KM is employed as part of a MAC algorithm to in effect sign the sent data and verify same. Such a MAC algorithm for symmetrically signing and verifying is known or should be apparent to the relevant public and therefore need not be set forth herein in any detail. Accordingly, any appropriate MAC algorithm may be employed without departing from the spirit and scope of the present invention. For example, if the sent data is a stream, the MAC algorithm may be a running MAC algorithm performed over each block of the stream, such as OMAC-1, whereas if the sent data is a discrete quantity in nature, the MAC algorithm may be a static MAC algorithm.

In one embodiment of the present invention, KC and KM are calculated from the shared secret z by each of the processor 22 and the peripheral 24 based on a pre-determined one-way hash function HASH, and based on common access to commonly known constants K1 and K2, where:

$$KC=\text{HASH}\,(K1, z), \text{ and}$$

$$KM=\text{HASH}\,(K2, z)$$

(step 415). Such one-way hash function HASH is known or should be apparent to the relevant public and therefore need not be set forth herein in any detail. Accordingly, any appropriate one-way hash function HASH may be employed without departing from the spirit and scope of the present invention. For example, such one-way hash function HASH may be the known CBCMAC_AES hash function.

Now that the processor 22 and the peripheral 24 have a shared set of symmetric keys (KC, KM) for exchanging trusted data therebetween, and referring now to FIG. 5, such trusted data is in fact exchanged in the following trusted manner such that the path 26 can be considered to be trusted. Preliminarily, it is to be appreciated that the processor 22 could send data directed toward the peripheral 24 by way of the path 26, or could simply tell the peripheral 24 where to obtain the data by way of the path 26. However, inasmuch as the peripheral 24 is now trusted and the processor 22 wishes to ensure that the trusted data goes to the peripheral 24 and only to such peripheral 24, such processor 22 instead stores the data and related information in a memory 32 available by way of the path 26, tells the peripheral 24 where and how to obtain such data and related information in the memory 32, and trusts that the peripheral 24 will retrieve the data from the memory, verify same, and employ such retrieved and verified data only in a trusted manner.

In one embodiment of the present invention, the memory 32 includes a trusted section available only to the processor 22 for storing trusted data therein, and a non-trusted section available to the processor 22 and to the peripheral 24 for storing non-trusted data therein and also for storing trusted data in an encrypted form. Inasmuch as the peripheral 24 cannot access the trusted data in the trusted section of the memory 32, the processor must store such trusted data in an encrypted form in the non-trusted section of the memory 32 and then provide the peripheral 24 with particulars on how to access such encrypted trusted data in the non-trusted section of the memory 32 by way of the path 26.

Figure 5:
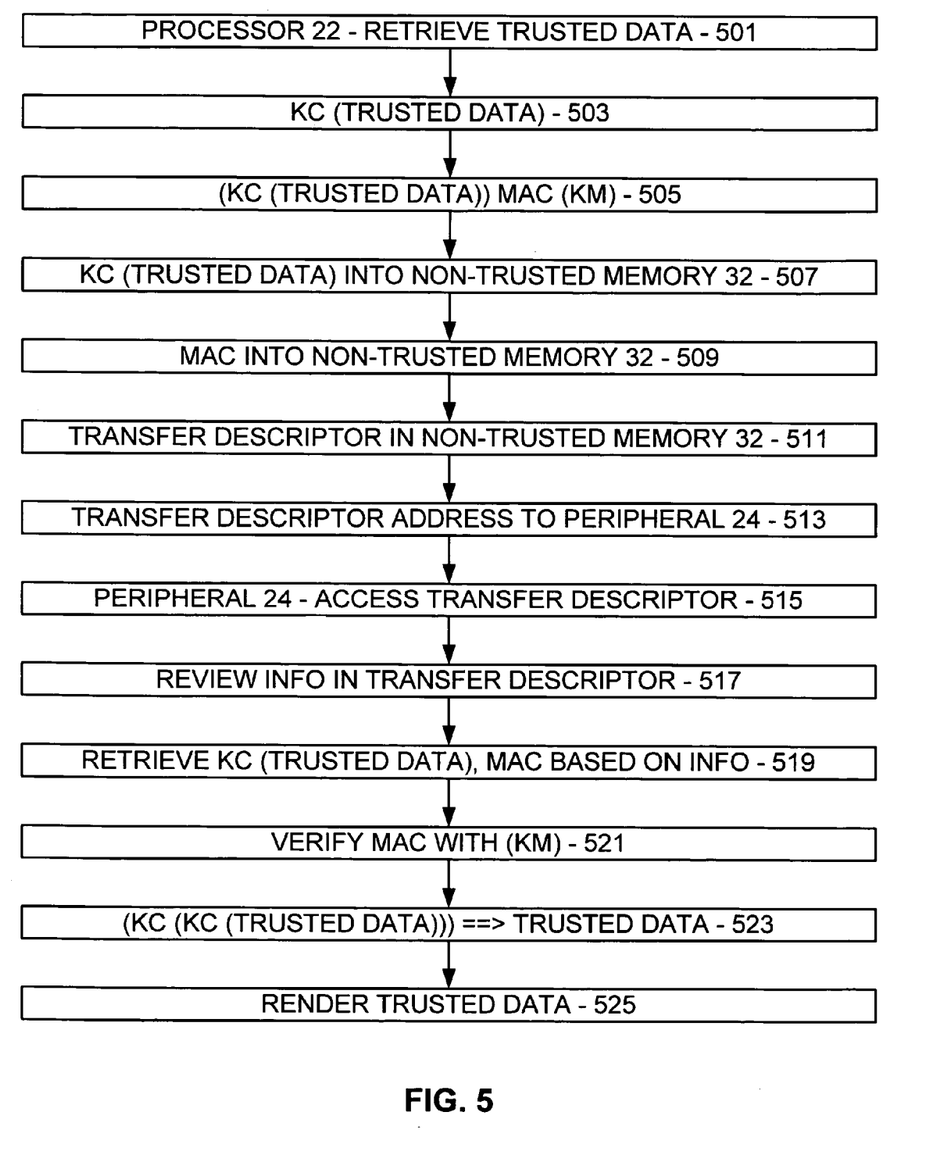
FIG. 5 is a flow diagram showing key steps performed by the elements of FIG. 1 in the processor and the peripheral exchanging data in a trusted manner.

In particular, and as shown in FIG. 5, in one embodiment of the present invention, the processor 22 sends trusted data to the peripheral 24 by retrieving such trusted data from the trusted section of the memory 32 (step 501), encrypting such trusted data according to the content key KC and based on a symmetric algorithm such as AES (step 503), performing a MAC algorithm over the encrypted trusted data according to the MAC key KM to produce MAC data (step 505), storing the encrypted trusted data in the non-trusted section of the memory 32 (step 507), and storing the MAC data in such non-trusted section of the memory 32 (step 509). Note, though, that while the processor 22 can typically access the entirety of the stored encrypted trusted data in the memory 32 by way of a virtual address and a virtual address translator, the peripheral 24 cannot typically likewise do so but instead must access the stored encrypted trusted data and the corresponding MAC data in the memory 32 by way of the physical address thereof. Moreover, inasmuch as the stored encrypted trusted data and the MAC data is most likely stored in such memory 32 at multiple non-contiguous blocks thereof, the peripheral 24 must access the stored encrypted trusted data and the MAC data in the memory 32 by way of the physical address of each such block.

Accordingly, the processor 22 must not only store the encrypted trusted data and the corresponding MAC data in the memory 32 as at steps 507 and 509, but must also store information about how to access such stored encrypted trusted data and MAC data in the memory 32 so that the peripheral 24 can in fact so access such data. Thus, the processor 22 in fact stores such accessing information as a transfer descriptor in the non-trusted section of the memory 32 (step 511), and then provides the peripheral 24 with the physical address of such transfer descriptor in such memory 32 (step 513).

Note that the transfer descriptor is known or should be apparent to the relevant public and therefore need not be disclosed herein in any detail. Thus, the transfer descriptor may have any appropriate form and content without departing from the spirit and scope of the present invention. For example, the transfer descriptor as stored in the non-trusted section of the memory 32 may comprise a contiguous array of ordered entries, where each entry describes a block or series of contiguous blocks of data in the memory 32, including a physical address and length. Thus, the encrypted trusted data and the MAC data may be reconstructed according to such ordered entries.

As should now be appreciated, based on the provided physical address of the transfer descriptor in the memory 32, the peripheral 24 accesses the transfer descriptor in the memory 32 at the aforementioned physical address (step 515), reviews the information in the transfer descriptor about how to access the stored encrypted trusted data and MAC data in the memory 32 (step 517), and in fact retrieves such stored encrypted trusted data and MAC data in the memory 32 based on such information (step 519). Thereafter, the peripheral 24 verifies the retrieved encrypted trusted data based on the retrieved corresponding MAC data and according to the MAC key KM (step 521), and presuming such verification succeeds, the peripheral 24 decrypts the retrieved encrypted trusted data based on the content key KC (step 523) and renders same as appropriate (step 525).

CONCLUSION

The present invention may be practiced with regard to any appropriate processor 22, peripheral 24, and path 26 therebetween. Accordingly, the present invention is to be interpreted to encompass establishing trustworthiness of any peripheral 24 so as to create a trusted path 26 for content 12 to be transmitted thereto.

Note here that although the present invention is disclosed primarily in terms of transmitting protected content 12 such as video data, audio data, and the like, the content 12 may in fact be any form of data without departing from the spirit and scope of the present invention, such as command data, housekeeping data, accounting data, metadata, status data, other forms of data representative of content 12, etc. Thus, the content 12 need not necessarily be at least a portion of some multimedia presentation, or at least a portion of protected data from an external source, but can also be data such as charge account data in connection with an on-line transaction, medical data from a medical record, secure on-line conversation data, or any other type of data that a nefarious entity would seek to steal, view, modify, etc. in the course of such data transiting from a processor 22 to a peripheral 24 in a computing device 14.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful architecture and method that define a trusted path 26 by which content 12 can be transmitted from a processor 22 to a peripheral 24 in a computing device 14. In particular, a need exists for a method and architecture that defines how to establish that a peripheral 24 in a computing device 14 is trustworthy.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method for a processor of a computing device to obtain a trusted identification of a hardware peripheral of the computing device, the processor and the peripheral being coupled by a path through which data is to be exchanged therebetween, the method comprising:

the processor and the peripheral deriving a set of shared keys based on the identification of the peripheral by:

the processor and the peripheral each generating a random value, performing a first operation based on the random value thereof to produce an intermediary value, and sending the produced intermediary value to each other by way of the path;

the peripheral generating a signed representation of the intermediary value and sending the signed representation to the processor by way of the path, the signed representation being verifiable by the processor according to the identification of the peripheral;

the processor and the peripheral each performing a second operation based on the intermediary value from each other and also based on the random value thereof to produce a final value, the final value as produced by the processor being equal to the final value as produced by the peripheral and thus constituting a shared secret known only to the processor and the peripheral;

the processor and the peripheral each employing the shared secret to generate the set of shared keys;

the processor requesting by way of a trusted hardware channel that the peripheral provide the identification to such processor by way of such trusted channel, the trusted channel being independent of and exterior to the path;

the processor receiving by way of the trusted hardware channel the identification from the peripheral; and the processor, having prior knowledge of the peripheral and the identification thereof, concluding based on the received identification by way of the trusted channel that the peripheral is indeed the peripheral and imparting trust to the peripheral based on such conclusion, and exchanging data with the peripheral over the path based on the identification.

2. The method of claim 1 further comprising the processor and the peripheral employing the identification to derive a set of mutually agreed-upon shared keys to be employed to exchange data therebetween, and in fact exchanging data therebetween based on the set of mutually agreed-upon shared keys.

3. The method of claim 1 wherein the computing device includes a trusted hardware module (THM) physically interposed between the processor and the peripheral to form the trusted hardware channel therebetween, the THM being trusted to communicate with both the processor and the peripheral in a trusted manner over the trusted channel and being identifiable to the processor over the trusted channel, the method comprising:

the processor requesting the THM over the trusted channel formed thereby to obtain the identification from the peripheral;

the THM in turn requesting the peripheral over the trusted channel formed thereby to provide such identification;

the peripheral returning the identification to the THM over the trusted channel formed thereby; and the THM in turn returning the identification to the processor over the trusted channel formed thereby, whereby each request and return over the trusted channel assures the processor that the identification returned is in fact from the peripheral.

4. The method of claim 3 wherein the peripheral includes therewith a unique public-private security key pair (PU-PER, PR-PER), and wherein the identification of the peripheral is (PU-PER).

5. The method of claim 1 wherein the peripheral includes therewith a unique public-private security key pair (PU-PER, PR-PER), and wherein the identification of the peripheral is (PU-PER).

6. A method for a processor of a computing device and a hardware peripheral of the computing device to derive a set of shared keys, the processor and the peripheral being coupled by a path through which data is to be exchanged therebetween, the method comprising:

the processor and the peripheral each generating a random value, performing a first operation based on the random value thereof to produce an intermediary value, and sending the produced intermediary value to each other by way of the path;

the peripheral generating a signed representation of the intermediary value and sending the signed representation to the processor by way of the path, the signed representation being verifiable by the processor;

the processor and the peripheral each performing a second operation based on the intermediary value from each other and also based on the random value thereof to produce a final value, the final value as produced by the processor being equal to the final value as produced by the peripheral and thus constituting a shared secret known only to the processor and the peripheral; and the processor and the peripheral each employing the shared secret to generate the set of shared keys.

7. The method of claim 6 further comprising the processor obtaining a trusted identification of the peripheral, and comprising the processor verifying the signed representation according to the obtained trusted identification.

8. The method of claim 6 comprising the processor and the peripheral forming a Diffie-Hellman key exchange to produce the shared secret.

9. The method of claim 6 comprising the processor and the peripheral each employing the shared secret to generate a shared symmetric content key KC to encrypt and decrypt data sent between the processor and the peripheral and a shared symmetric MAC key KM employed as part of a MAC algorithm to sign sent data and verify same.

10. The method of claim 9 wherein the processor and the peripheral each calculate KC and KM from the shared secret z based on a pre-determined one-way hash function HASH and based on common access to commonly known constants K1 and K2, where:

$KC = \text{HASH}(K1, z)$, and $KM = \text{HASH}(K2, z)$.

11. The method of claim 6 wherein the processor and the peripheral mutually generate based on the shared secret a shared symmetric content key KC to encrypt and decrypt the data and a shared symmetric MAC key KM employed as part of a MAC algorithm to sign the data and verify same, the method further comprising the processor sending trusted data to the peripheral by:

the processor retrieving the data from a trusted section of a memory of the computing device, encrypting such data according to the content key KC, performing the MAC algorithm over the encrypted trusted data according to the MAC key KM to produce MAC data, storing the encrypted trusted data in a non-trusted section of the memory, and storing the MAC data in such non-trusted section of the memory;

the processor storing information regarding how to access such stored encrypted trusted data and MAC data in the memory as a transfer descriptor in the non-trusted section of the memory, and then providing the peripheral by way of the path with a physical address of such transfer descriptor in such memory;

the peripheral accessing the transfer descriptor in the memory at the physical address thereof by way of the path, reviewing the information in the transfer descriptor, and retrieving the stored encrypted trusted data and MAC data in the memory based on the information and by way of the path, and the peripheral verifying the retrieved encrypted trusted data based on the retrieved corresponding MAC data and according to the MAC key KM, and presuming such verification succeeds, the peripheral decrypting the retrieved encrypted trusted data based on the content key KC and rendering the decrypted trusted data.

12. A method for a processor of a computing device to send trusted data to a hardware peripheral of the computing device, the processor and the peripheral being coupled by a path through which the data is to be exchanged therebetween, the method comprising:

the processor and the peripheral mutually generating a shared symmetric content key KC to encrypt and decrypt the data and a shared symmetric MAC key KM employed as part of a MAC algorithm to sign the data and verify same;

the processor retrieving the data from a trusted section of a memory of the computing device, encrypting such data according to the content key KC, performing the MAC algorithm over the encrypted trusted data according to the MAC key KM to produce MAC data, storing the encrypted trusted data in a non-trusted section of the memory, and storing the MAC data in such non-trusted section of the memory;

the processor storing information regarding how to access such stored encrypted trusted data and MAC data in the memory as a transfer descriptor in the non-trusted section of the memory, and then providing the peripheral by way of the path with a physical address of such transfer descriptor in such memory;

the peripheral accessing the transfer descriptor in the memory at the physical address thereof by way of the path, reviewing the information in the transfer descriptor, and retrieving the stored encrypted trusted data and MAC data in the memory based on the information and by way of the path, and the peripheral verifying the retrieved encrypted trusted data based on the retrieved corresponding MAC data and according to the MAC key KM, and presuming such verification succeeds, the peripheral decrypting the retrieved encrypted trusted data based on the content key KC and rendering the decrypted trusted data.

13. The method of claim 12 comprising the processor storing information regarding how to access such stored encrypted trusted data and MAC data in the memory as a transfer descriptor in the non-trusted section of the memory, the transfer descriptor including a contiguous array of ordered entries, each entry describing a block or series of contiguous blocks of data in the memory, including a physical address and length, whereby the encrypted trusted data and the MAC data are reconstructed according to such ordered entries.

14. The method of claim 12 comprising the processor and the peripheral mutually generating KC and KM based on a shared secret.

* * * * *